F. OLSON.
ONION HARVESTING MACHINE.
APPLICATION FILED AUG. 24, 1910.
989,279.
Patented Apr. 11, 1911.
4 SHEETS—SHEET 1.
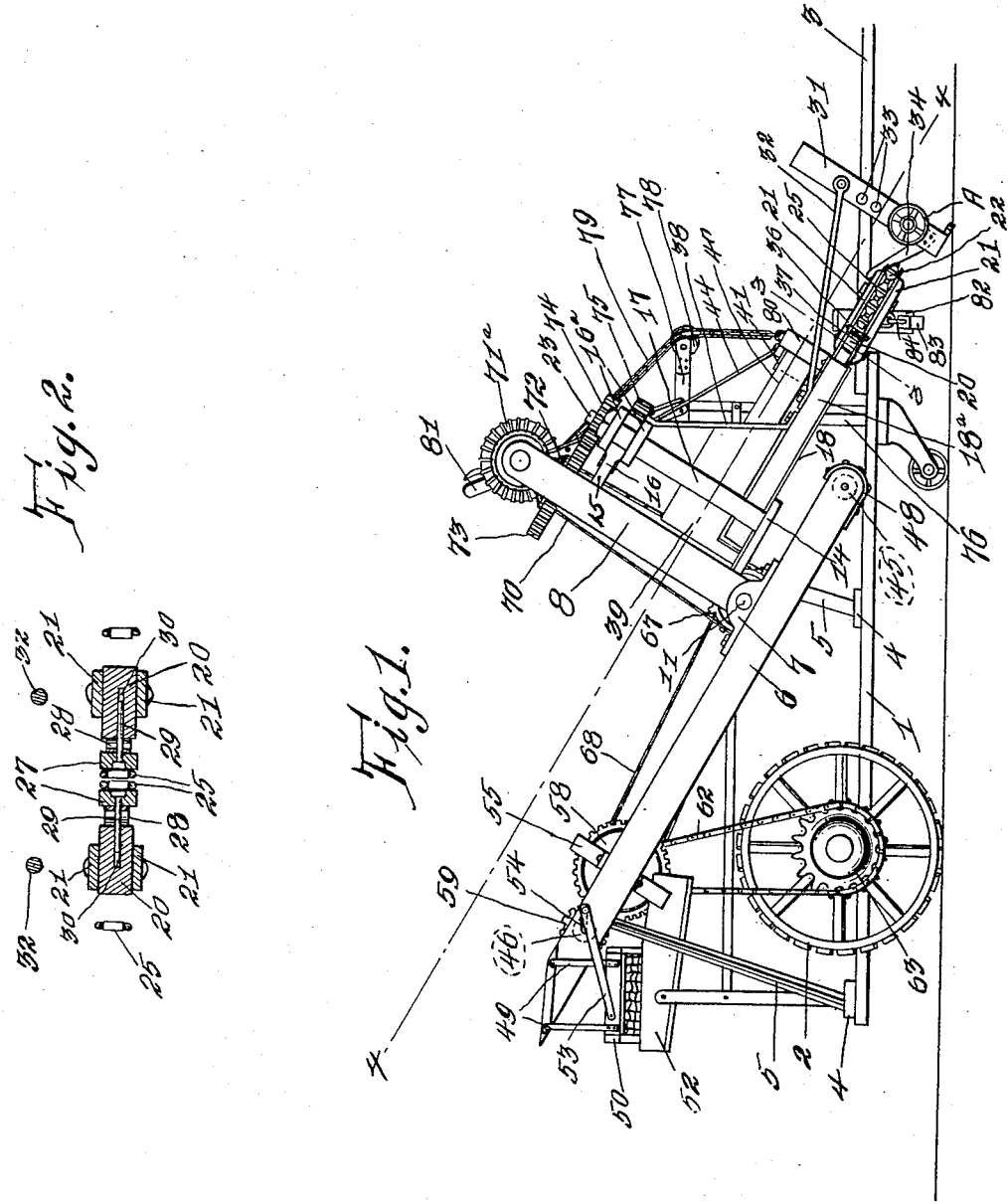
Witnesses:
Arthur E. Weak
Myron L. Clean
Inventor:
Frank Olson,
by Milo P. Stevens & Co.
Attorneys.

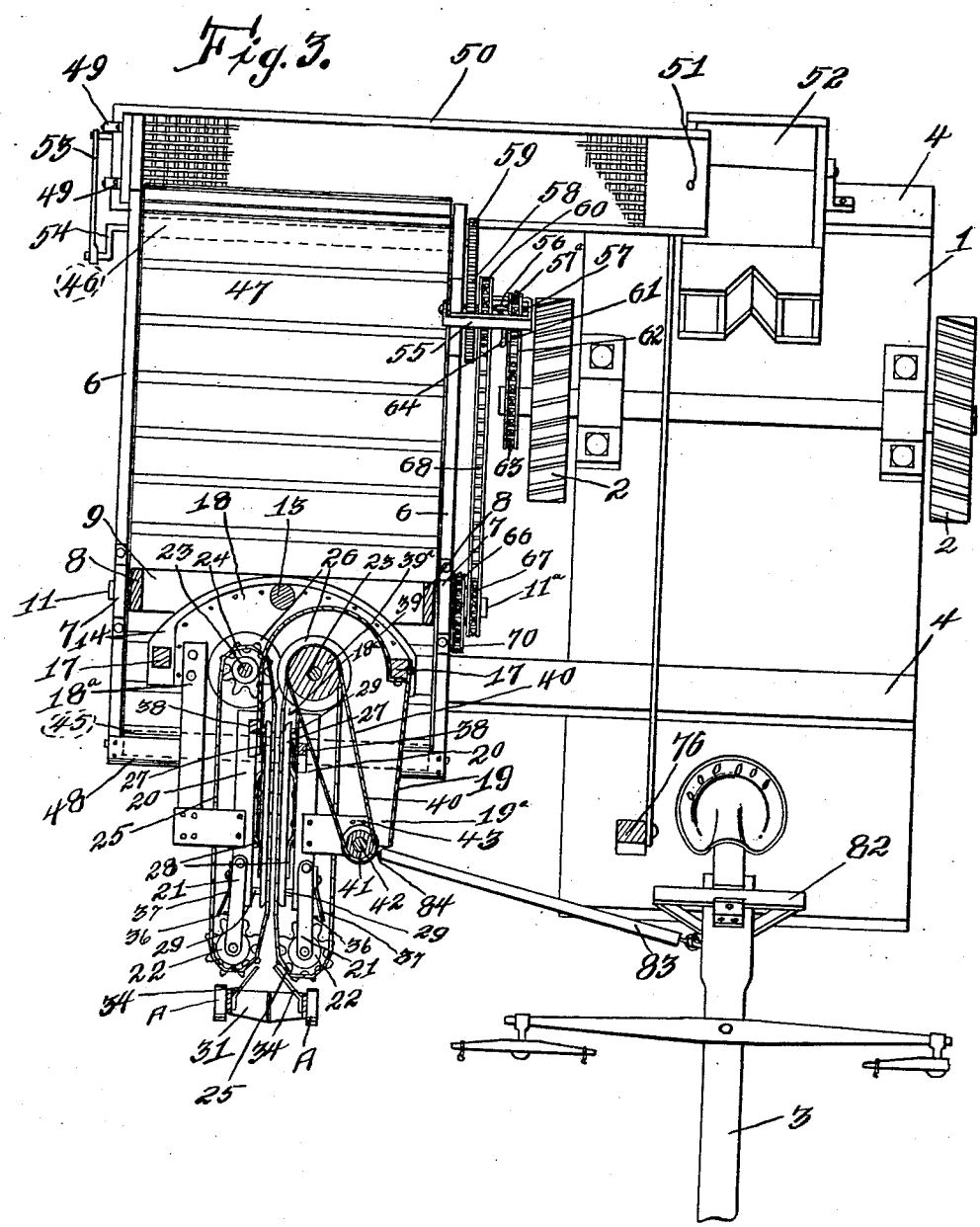

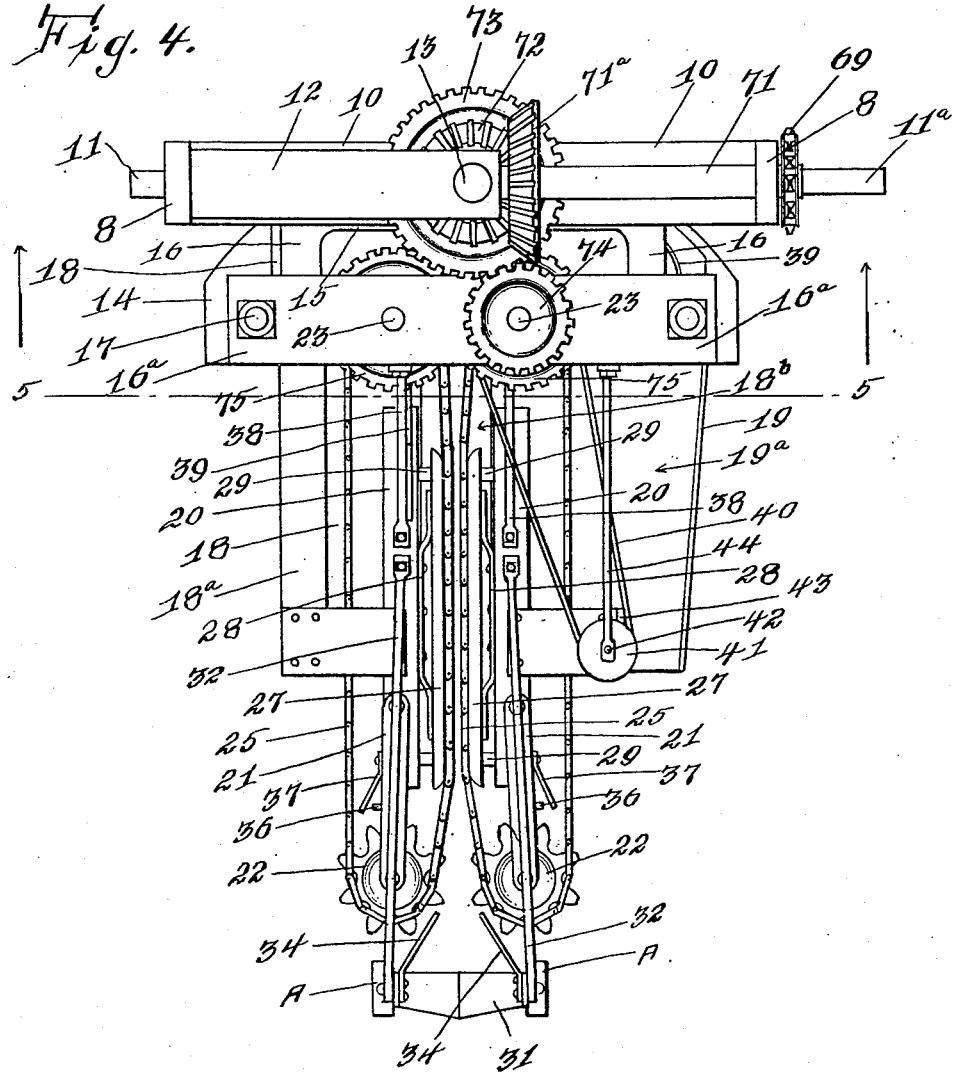

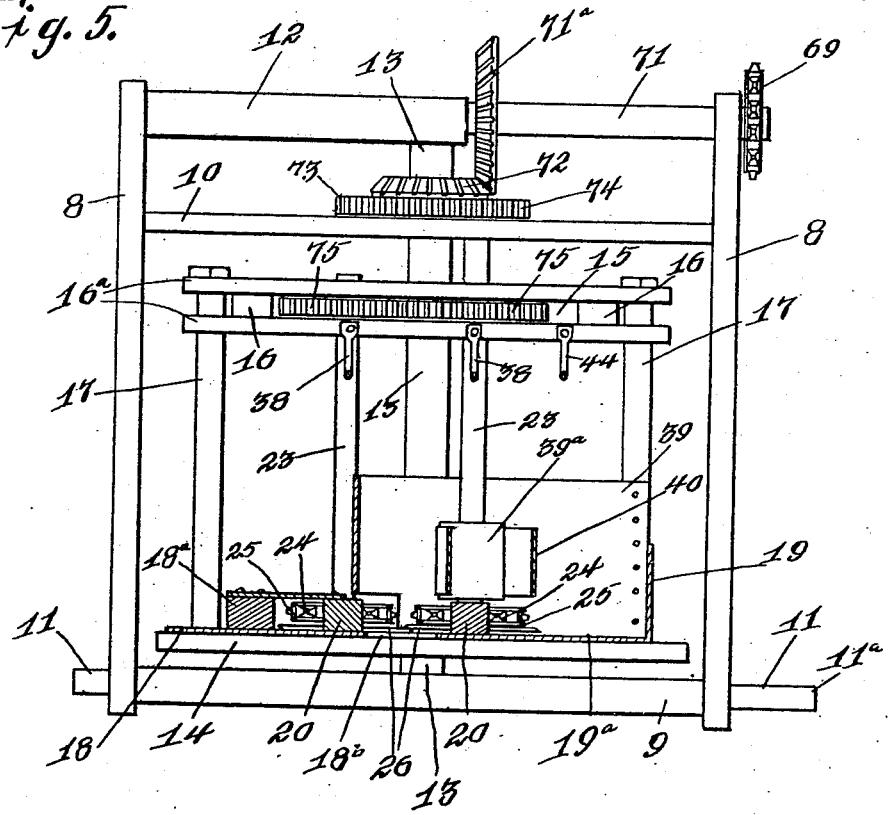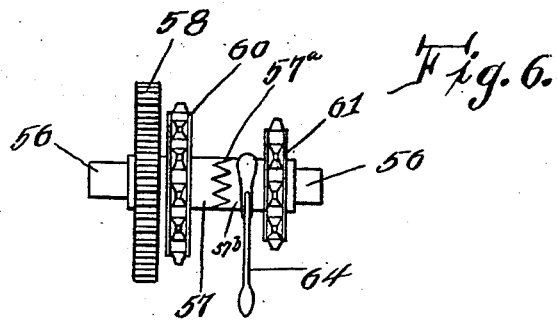

UNITED STATES PATENT OFFICE.

FRANK OLSON, OF NILES, ILLINOIS.

ONION-HARVESTING MACHINE.

989,279.　　　　　Specification of Letters Patent.　　Patented Apr. 11, 1911.

Application filed August 24, 1910.　Serial No. 578,629.

*To all whom it may concern:*

Be it known that I, FRANK OLSON, a citizen of the United States, residing at Niles, in the county of Cook and State of Illinois, have invented certain new and useful Improvements in Onion-Harvesting Machines, of which the following is a specification.

My invention relates to a vegetable harvester, but is designed more particularly for harvesting onions.

Broadly speaking, my invention comprises a plow which is adapted to break and loosen the ground where the onions have been growing, means for engaging the tops of the onions after they have been loosened by the plow, to raise or withdraw them from the ground and deliver them to a cutting mechanism where the tops are severed from the onions and dropped back on the field, means for catching the onions after the tops have been cut therefrom and conveying them to a shaking screen where the onions will be separated from adhering earth, and a hopper for receiving the onions as they are discharged from the screen.

The principal object of my invention comprehends the production of a machine of the above character, in which the plowing device, the means for withdrawing the onions from the ground and the cutting mechanism, together with the gearing for operating these means, are all mounted in a suitable frame work supported on and above the lower end of the conveyer, in such a manner as to permit the frame to be tilted vertically to enable the plow to be raised out of contact with the ground when the machine is being drawn from place to place, and also to be shifted laterally in either direction to follow the row of onions.

A further object of my invention resides in arranging the traction truck to one side of the harvesting mechanism, whereby the draft animals will not trample on the crop.

In the accompanying drawings which illustrate the preferred embodiment of my invention, and in which like reference numerals indicate corresponding parts throughout the several views:—Figure 1 is a side elevation of the machine complete. Fig. 2 is an enlarged sectional view taken on the line 3—3 of Fig. 1. Fig. 3 is a longitudinal sectional view taken on the line 4—4 of Fig. 1, looking down. Fig. 4 is an enlarged top plan view of the harvesting mechanism proper and its frame work, removed from the machine. Fig. 5 is a vertical sectional view taken on line 5—5 of Fig. 4, looking in the direction indicated by the arrows, and Fig. 6 is an enlarged detail.

Referring specifically to the drawings, and the reference numerals indicated thereon, 1 indicates the platform of a suitable truck, 2 the traction wheels, and 3 the tongue. These parts may be of any desired construction as they form no positive part of my invention.

Securely fastened to the platform 1 are horizontally arranged beams 4. These beams 4 project outwardly beyond the right hand side of the platform 1 and have mounted thereon, by means of standards 5, the side rails 6 of the conveyer, on which the several parts of my invention are supported. As shown on Fig. 1, the side rails of the conveyer are arranged at an angle of about 30° to the truck. Formed on the upper edge of the side rails 6 of the conveyer, at a suitable distance from their lower ends, are boxings 7, on which the frame which carries the harvesting mechanism proper is pivotally mounted to swing in a vertical plane. This frame comprises vertical side bars 8 connected at their lower ends by means of a transverse brace bar 9, and near their upper ends by means of a similar bar 10. When the machine is in operation these side bars 8 are at right angles to the side rails 6 of the conveyer.

The ends of the bar 9 are formed with trunnions 11 which extend through suitable openings formed in the side bars 8 and work in the boxings 7. The trunnion 11 on the side bar 8, adjacent the truck, extends beyond its boxing 7, as at 11$^a$, for a purpose to be hereinafter referred to. Securely fixed to the upper end of the outer side bar 8 above the upper transverse bar 10, and arranged in parallel relation thereto, is an arm 12, which extends slightly beyond the vertical center of the frame, and has the upper end of a vertical post 13 fixedly mounted therein. This post 13 passes downwardly through the brace bar 10 and has its lower end rigidly mounted in the lower brace bar 9. Loosely mounted on the post 13 adjacent the upper face of the brace bar 9 is a plate or turn table 14 which extends forwardly on a line parallel with the plane of the side rails 6 of the conveyer. The post 13 also has a yoke 15 loosely mounted thereon, adjacent the under side of the upper brace bar 10. The arms 16 of the yoke extend forwardly in parallel relation to the turn table 14, and have secured to their upper and lower faces, adjacent their outer ends, transverse bars 16ª. The turn table 14 and yoke 15 are held apart by standards 17, which have their lower ends rigidly mounted on the upper side of the turn table 14 and their upper ends fastened to the ends of the bars 16ª.

The upper face of the turn table 14 is covered with a sheet of stout metal 18, which extends forwardly beyond the front edge of the table, and has one of its edges bent upwardly, as at 19, to form a chute 19ª from which the onion tops, after they are severed from the onions, fall back on the ground. The opposite edge of the sheet is braced by means of a bar 18ª fastened at its rear end to the turn table 14.

The central portion of the metal sheet 18 from the edge of the table 14 forwardly, is cut away as at 18ᵇ to permit the passage of the onions to the cutters. Mounted adjacent to the longitudinal edges of the opening 18ª are forwardly extending members 20, which project a short distance beyond the front edge of the metal sheet 18, and have pivotally mounted on the outer ends thereof the inner ends of short arms 21, between the outer ends of which latter are journaled sprocket wheels 22. Rotatably mounted at their lower ends in the turn table 14 and at their upper ends in the bars 16ª of the yoke 15, are vertical shafts 23. These shafts 23 are in alinement with the members 20 and have sprocket wheels 24 fixed thereto. The sprockets 24 are in longitudinal alinement with the sprockets 22 and are connected therewith by sprocket chains 25. Also fixed to the shafts, immediately below the sprocket wheels 24, are rotary cutters 26, which are adapted to cut the tops from the onions as they are carried upwardly by the chains 25. To keep the meeting sides of the chains 25 in close contact with each other to firmly hold the tops of the onions therebetween, I provide the inner faces of the members 20 with bars 27, which are pressed inwardly against the sides of the chains 25 by means of flat springs 28. The bars 27 are held in position by means of pins 29, passing transversely through the bars 27 and working in alined openings 30 formed in the members 20.

The plow 31 is supported on the members 20 by means of brace rods 32 and occupies a position slightly forward of the sprocket wheels 24 and at right angles thereto, whereby the edge of the plow 31 will be presented at an angle to the ground and in traveling therethrough will cause the ground to be raised and broken. The distance between the chains 25 and the cutting edge of the plow is regulated, by attaching the front ends of the brace rods 32 to certain of the openings 33 formed in the sides of the plow the chains 25 will grip the tops of onions at a point near where they protrude from the ground.

The gage wheels A adjustably mounted on the sides of the plow prevent the same from going too deep into the ground.

To guide the tops of the onions between the chains 25, I provide the plow with wings 34, which extend rearwardly and toward each other to a point above the sprocket wheels 22, above mentioned. The arms 21, in which the sprocket wheels 22 are journaled, are pivoted to the members 20. This permits the sprockets 22 to spread slightly to allow the tops of the onions to enter between the chains more freely than if the sprockets were rigid. The outward movement of the sprockets is limited by means of small rods 36, secured to the outer sides of the arms 21, engaging stops 37, secured to the members 20. The members 20 are suitably braced and stayed, as by means of brace bars 38, connected at their lower ends to said members 20 and at their upper ends to the lower of the transverse bars 16ª of the yoke 15.

Fastened to one of the bars 38 is one end of a vertical shield 39 which extends rearwardly between the shafts 23 and is curved around the shaft 23 adjacent the chute 19ª, and has its other end fastened to the inner of the standards 17. The lower edge of the shield 39, except where it passes between the shafts 23 and over the sprocket wheel 24, is in contact with the upper face of the metal sheet 18, and is adapted to guide the onion tops as they are severed from the onions, to the chute 19ª. To prevent any liability of the onion tops accumulating and clogging the sprockets 24, I provide the shaft 23, adjacent the chute, with a pulley 39ª which rotates with said shaft, and is connected by means of a belt 40 to a pulley 41. The pulley 41 is loosely mounted on an axle 42, which latter is fixed to a block 43 at the end of the chute, and is braced by means of the rod 44. It will thus be seen that when the harvesting mechanism is in motion, the motion of the belt and pulley 39ª will feed the onion tops from the cutters to the chute 19ª.

As shown most clearly in Figs. 1 and 3, the lower ends of the side rails 6 of the conveyer extend a short distance forwardly of the cutters and have journaled near their lower ends the roller 45, over which, and the power roller 46 journaled in the side rails 6 near the upper ends, passes the endless conveyer 47. To prevent the onions from falling off the lower end of the conveyer, as they are dropped thereon from the cutters, I provide the lower ends of the side rails with a shield or hood 48.

By referring to Fig. 3, it will be seen that the outer of the side rails 6 is extended rearwardly beyond the upper end of the conveyer and has suspended thereto, by means of links 49, one end of a shaking screen 50. The other end of the screen is pivoted, as at 51, to a hopper 52 which is mounted on the platform 1 of the truck in any suitable manner. Motion is imparted to the screen 50 by means of a pitman 53, connected at one end to a crank 54, formed on the outer end of the shaft of the power roller 46 of the conveyer, and at its other end to the suspended end of the screen.

Mounted on the inner side rail 6, at a point above the inside traction wheel 2, is a frame 55, in which and said side rail 6 is mounted a stationary horizontal shaft 56 on which is loosely mounted a sleeve 57, provided with a clutch face 57$^a$. Fixed on the sleeve 57, adjacent the side rail 6, is a gear 58 which meshes with a pinion 59 fixed to the inner end of the shaft of the power roller 46. Also fixed to the sleeve 57, adjacent the inner face of the gear 58, is a sprocket wheel 60. The shaft 56 also carries a sprocket wheel 61, and a clutch member 57$^b$ coöperating with the clutch face 57$^a$. Motion is imparted to the sprocket 61 by means of a sprocket chain 62 which connects said sprocket wheel 61 with a large sprocket wheel 83 fixed to the axle of the inside traction wheel 2, and by means of the clutch 57$^b$, which is operated by a suitable shifting arm 64 pivoted to the frame 55, the machine may be thrown into and out of operation.

Rotatably mounted on the extended portion 11$^a$ of the trunnion 11, is a double sprocket having sprocket teeth 66 and 67, the latter being connected to the sprocket wheel 60 by means of a sprocket chain 68, and the former to a sprocket wheel 69 by means of a sprocket chain 70. The sprocket wheel 69 is fixed to the outer end of a shaft 71 which has its inner end rotatably mounted in the adjacent end of the arm 12 and its outer end in the side bar 8. Fixed to the inner end of the shaft 71 is a bevel gear 71$^a$ which meshes with a similar gear 72 formed integral with a gear 73, which latter is loosely mounted on the post 13 adjacent the upper face of the brace bar 10. The gear 73, in turn, meshes with a pinion 74 fixed to the upper end of the shaft 23, adjacent the traction truck. Fixed to each of the shafts 23, between the bars 16 is a gear 75 which gears mesh with each other and cause the shafts 23 to be rotated in opposite directions and toward each other. This will cause the chains 25 to travel in the same direction.

The means which I preferably employ to raise the front end of the frame which carries the harvesting mechanism comprise a standard 76 mounted on the platform of the truck, and an arm 77 securely fastened to the upper end of the standard and extending outwardly to a point above the chains 25 where it is provided with a roller 78. A cable 79 connected at one end to a loop 80, fastened to the members 20, passes over the roller 78, and is connected at its other end to a lever 81, pivoted to the arm 77 near its inner end, so as to be in easy reach of the driver.

The means for shifting the harvesting mechanism laterally in either direction, comprise a foot pedal in the form of a triangular frame 82 pivoted to the tongue 3 and having one end of a rod 83 connected thereto. The other end of the rod 83 is attached to the front end of the metal sheet 18 by means of a link 84.

Briefly stated, the operation of the harvesting mechanism is as follows: The plow is adjusted to enter the ground at a point a little below the onions. In passing through the ground, the plow will cause the ground to be raised and broken, to loosen the onions. The tops are then gripped by the chains 25, and as said chains 25 travel upwardly, the onions will be pulled from the ground and carried to the cutters 26 where the tops of the onions will be cut off, and discharged from the chute 19$^a$ on the ground. The onions drop onto the conveyer 47 and are elevated thereby to the shaking screen, where they are separated from any adhering earth, and discharged into the hopper 52, from which they are let into sacks.

While I have shown my invention in its preferred form, it will be understood that various changes may be made therein without departing from the appended claims and no limitation is implied by reason of the particular structure shown.

I claim—

1. In a vegetable harvester, a traction truck, a conveyer mounted on said truck at an angle thereto, a frame pivotally mounted on the side rails of said conveyer near its front end, a post mounted vertically and centrally in said frame, a turn table and a yoke loosely mounted on said post within the frame, said turn table and yoke being spaced apart by standards, and means carried by the turn table and yoke for withdrawing the vegetables from the ground.

2. In a vegetable harvester, comprising a traction truck, a conveyer mounted on said traction truck, adjacent one side thereof and at an angle thereto, a frame pivotally mounted on said conveyer near its lower end, a vertical post mounted centrally within said frame, a turn table loosely mounted on said post, a yoke also loosely mounted on the post above the turn table, and spaced therefrom by standards, vertical shafts rotatably mounted in said yoke and turn able, sprocket wheels fixed to said shafts, longitudinally arranged members carried by the turn table and extending forwardly from said sprocket wheels, arms pivotally mounted on the forward ends of said members, sprocket wheels journaled in said arms, and chains connecting said sprocket wheels with the first mentioned sprocket wheels, and a plow carried by the aforesaid members, said plow being adjustably mounted, and arranged a short distance in front of the chains.

3. In a vegetable harvester, a traction truck, a conveyer frame supported by said truck and arranged to one side thereof, a frame pivotally mounted on said conveyer frame, a post mounted vertically and centrally in said frame, a turn table and yoke loosely mounted on said post and spaced apart by standards, a metal plate fastened to said turn table and extending forwardly therefrom, an opening formed centrally in said plate, members mounted on said plate adjacent the edges of the opening, and sprocket wheels pivotally mounted on the ends of said members, vertical shafts rotatably mounted in said turn table and yoke, sprocket wheels fixed to said shafts, and chains connecting said sprocket wheels with the first mentioned sprocket wheels, and means for keeping the adjacent sides of the chains in close contact with each other, and gearing operated by the rotation of the main traction wheels for rotating the aforesaid shafts in opposite directions.

4. In a vegetable harvester, a conveyer frame having an endless apron mounted therein, a main frame pivotally mounted on said conveyer frame, a post mounted vertically in said main frame, a turn table and yoke loosely mounted on said post, and means carried by the turn table and yoke for harvesting the onions, and foot operated means for swinging said turn table and yoke laterally on the post, and means for tilting the aforesaid main frame upwardly to bring the harvesting means above the ground.

5. In a vegetable harvester, a traction truck, a frame pivotally mounted thereon to swing in a vertical plane, a rotary support carried by the frame, and a digger carried by said support.

6. In a vegetable harvester, a traction truck, a supporting frame mounted thereon, spaced members carried by the supporting frame and extending forwardly therefrom, laterally swinging arms pivoted to said members and extending forwardly therefrom, sprocket wheels carried by the arms, companion sprocket wheels on the supporting frame, conveyer chains passing over said sprocket wheels, and running along the opposite edges of the aforesaid spaced members, and a digger carried by the supporting frame in front of the first-mentioned sprocket wheels.

In testimony whereof I affix my signature in presence of two witnesses.

FRANK OLSON.

Witnesses:
PETER F. LENZEN,
FRANK LENZEN.

---

Copies of this patent may be obtained for five cents each, by addressing the "Commissioner of Patents, Washington, D. C."